| (12) | United States Patent | (10) Patent No.: US 10,533,716 B2 |
|---|---|---|
| | Moon et al. | (45) Date of Patent: Jan. 14, 2020 |

(54) CEILING LAMP WITH LIGHT GUIDE PLATE AND ASSEMBLY METHOD THEREOF

(71) Applicant: Sang Pil Moon, Seoul (KR)

(72) Inventors: Dai Sung Moon, Seoul (KR); Sang Pil Moon, Seoul (KR)

(73) Assignee: Sang Pil Moon, Seoul (KR)

( * ) Notice: Subject to any disclaimer, the term of this patent is extended or adjusted under 35 U.S.C. 154(b) by 114 days.

(21) Appl. No.: 15/862,614

(22) Filed: Jan. 4, 2018

(65) Prior Publication Data

US 2018/0128434 A1    May 10, 2018

Related U.S. Application Data

(63) Continuation of application No. PCT/CN2016/084665, filed on Jun. 3, 2016.

(51) Int. Cl.
```
F21S 8/04      (2006.01)
F21V 8/00      (2006.01)
F21V 21/108    (2006.01)
F21V 15/01     (2006.01)
F21V 17/10     (2006.01)
F21V 21/02     (2006.01)
F21V 23/00     (2015.01)
F21Y 103/33    (2016.01)
```
(Continued)

(52) U.S. Cl.
CPC .............. F21S 8/04 (2013.01); F21V 15/01 (2013.01); F21V 17/10 (2013.01); F21V 21/02 (2013.01); F21V 21/108 (2013.01); F21V 23/005 (2013.01); G02B 6/0051 (2013.01); G02B 6/0055 (2013.01); G02B 6/0088 (2013.01); F21V 7/05 (2013.01); F21V 13/04 (2013.01); F21V 2200/20 (2015.01); F21Y 2103/33 (2016.08); F21Y 2115/10 (2016.08)

(58) Field of Classification Search
CPC ... F21S 8/036; F21S 8/04; F21S 8/043; F21V 21/108; F21V 17/08; F21V 17/10; F21V 23/005; F21Y 2103/33; G02B 6/0051; G02B 6/0055; G02B 6/0088
See application file for complete search history.

(56) References Cited

U.S. PATENT DOCUMENTS

| 5,034,869 A * | 7/1991 | Choi ................. F21S 8/04 248/343 |
| 2014/0029252 A1* | 1/2014 | Kato ............... F21V 23/002 362/235 |

(Continued)

FOREIGN PATENT DOCUMENTS

| CN | 201636779 U | 11/2010 |
| CN | 201983142 U | 9/2011 |

(Continued)

OTHER PUBLICATIONS

English Machine Translation of CN 203771235 provided by Espacenet (Year: 2014).*

(Continued)

*Primary Examiner* — Zheng Song

(57) ABSTRACT

The present invention relates to a ceiling lamp with a light guide plate and an assembly method thereof. The ceiling lamp consists of a board assembly, and a lamp body assembly attached to the board assembly via a fixation assembly.

8 Claims, 2 Drawing Sheets

(51) Int. Cl.
*F21V 13/04* (2006.01)
*F21V 7/05* (2006.01)
*F21Y 115/10* (2016.01)

(56) References Cited

U.S. PATENT DOCUMENTS

2015/0008473 A1* 1/2015 Lee ................. H01L 33/642
                                                    257/99
2017/0265302 A1* 9/2017 Kim ................. H05K 1/181
2018/0259701 A1* 9/2018 Yuki ................. F21S 2/00

FOREIGN PATENT DOCUMENTS

| | | | |
|---|---|---|---|
| CN | 203628467 U | 6/2014 | |
| CN | 203771235 * | 8/2014 | ............ F21S 8/04 |
| CN | 203771235 U | 8/2014 | |
| CN | 205174154 U | 4/2016 | |
| CN | 105546428 A | 5/2016 | |
| KR | 101472726 * | 12/2014 | ............ F21S 2/005 |

OTHER PUBLICATIONS

International Search Report of PCT Patent Application No. PCT/CN2016/084665 dated Mar. 10, 2017.

* cited by examiner

CEILING LAMP WITH LIGHT GUIDE PLATE AND ASSEMBLY METHOD THEREOF

CROSS-REFERENCE TO RELATED APPLICATIONS

The present application is a Continuation Application of PCT application No. PCT/CN2016/084665 filed on Jun. 3, 2016, the contents of the above are hereby incorporated by reference.

FIELD OF THE INVENTION

The present invention relates to a ceiling lamp with a light guide plate and an assembly method thereof.

BACKGROUND OF THE INVENTION

CN 201520870338.2 discloses an LED ceiling lamp having a circular light guide plate. This technique aims at providing LED ceiling lamp having a circular light guide plate, whose structural design is reasonable, light efficiency is good, appearance is ultra-thin, whole shape is succinct, energy-conserving high-efficient luminance is high. The technique is summarized as it includes a dustcoat and a chassis, the dustcoat is rotatory fixed with the chassis, and the LED ceiling lamp is further provided with a light diffusion plate, a light guide plate, a light reflection paper, an aluminum plate, an ultra-thin drive and an LED luminescent plate. The LED luminescent plate is installed on the aluminum plate. The light reflection paper, the light guide plate, the light diffusion plate are arranged on the LED luminescent plate in order. The aluminum plate is fixed on the dustcoat, and a protective ring is installed on the chassis, and the ultra-thin drive is fixed on the chassis. The dustcoat is provided with a screw hole for fixing the aluminum plate and a buckle for fixing the chassis, the buckle is engaged with a groove of the chassis. The disadvantage of this utility model situates where the ceiling lamp could only be assembled if the dustcoat is open and the dustcoat needs to be buckled after the assembly is finalized. This causes an inconvenient assembly, complicated structure and high cost.

CN 201511023824.1 discloses an LED ceiling lamp with light guide plate. This technique aims at providing an LED ceiling lamp with light guide plate with a performance matching its operating standards, a simple and controllable manufacturing process and a lower cost. The technique is summarized as the LED ceiling lamp comprises a power shell, a power box cover, the light guide plate, a PCB, an LED light source, a reflecting film and wiring terminals. The light guide plate is annular. The annular reflecting film is arranged on the lower surface of the light guide plate. The upper surface of the light guide plate is of a prism structure, and a concave point is formed in the lower surface of the light guide plate. The PCB is arranged below the reflecting film and provided with the wiring terminals. The power shell and the power box cover are sequentially arranged above the light guide plate. The LED light source is arranged below the light guide plate. The disadvantage of this invention is that the main body of the ceiling lamp is divided into two pieces, which is adverse to lowering the cost or convenient assembly. The assembly requires as well opening the lamp cover, which adds to the difficulty to the assembly.

SUMMARY OF THE INVENTION

The present invention aims at overcoming the above-mentioned drawbacks and providing a ceiling lamp with a light guide plate that is manufactured at low cost, has convenient assembly method and could be assembled without opening its lamp cover. The present invention also aims at providing an assembly method that is inexpensive and could efficiently prevent the lamp body from falling off the ceiling.

The ceiling lamp with the light guide plate in the present invention consists of a board assembly and a lamp body assembly, where the lamp body assembly is attached to the board assembly via a fixation assembly.

Preferably, the board assembly consists of a cross-shaped connecting board pierced with a first center hole and a bending sheet attached to the cross-shaped connecting board, wherein the bending sheet has a bending portion that extends from an end of the bending sheet and vertically stands against an edge of a backboard and a brink that projects from an end of the bending portion.

Preferably, the bending sheet consists of four slats that form a cross, positioning holes located on the slats, four bending portion each extending vertically from an end of the slat, and four brinks each projecting from the bending portion.

Preferably, the lamp body assembly consists of a lamp cover with a circumferential edge having an annular groove, a plurality of lamp cover screw holes that are vertically distributed on an internal surface of the annular groove, an optical diffuser, the light guide plate, an aluminum board wrapping around a circumferential side wall of the light guide plate, a reflector board and the backboard; wherein the optical diffuser, the aluminum board and the reflector board are orderly arranged in a round tray confined by the annular groove.

Preferably, the backboard consists of a board, a pair of semi-circular-shaped convexes that are symmetrically protruding from two symmetrical semi-circle portions of one side of the board, a pair of semi-circular-shaped concave cavities correspondingly formed on the other side of the board, a second center hole located on the board, and a plurality of tapped holes arranged on an edge of the backboard. Each of the semi-circular-shaped concave cavities is provided with a PCB and a plurality of sponge blocks that are located around the PCB.

Preferably, a plurality of bulging blocks are radiated from the circumferential side wall of the light guide plate, the aluminum board is attached with an LED light source.

Preferably, the backboard, the optical diffuser, the light guide plate, the aluminum board, the LED light source and the reflector board are fixedly arranged in the light body assembly through the screws screwing in the tapped holes on the backboard and then in the lamp cover screw holes. The bending portion is stopped from moving by a buckle located on an edge of an outer wall of the annular groove so that the board assembly is fixedly connected to the round tray of the annular groove and the lamp body assembly is therefore fixedly connected to the board assembly.

Preferably, the buckle located on the edge of the outer wall of the annular groove of the lamp cover is provided with a first bump. A second bump is provided on the brink of the board assembly. When rotating the light body assembly, the first bump on the buckle thus clips to lock when hitting the second bump on the brink of the board assembly, in this way, the assembly of the ceiling lamp is complete.

The present invention also aims at providing an assembly method of the ceiling lamp with the light guide plate, which comprises the following steps:

fixing a buckle to an annular groove of a lamp cover through screwing screws;

welding a bending sheet to a cross-shaped connecting board;

placing PCBs and a plurality of sponge blocks in two semi-circular-shaped convexes of a backboard, connecting the PCB to an LED light source that is attached to an aluminum board;

placing an optical diffuser, the aluminum board wrapping around a circumferential side wall of a light guide plate, the reflector board and the backboard successively in a round tray of the lamp cover and fixing them to the lamp cover through screwing screws in tapped holes on the backboard;

rotating the light body assembly to enable a first bump on the buckle to clip to lock when hitting a second bump on a brink of the board assembly, so as to complete the assembly of the ceiling lamp.

Preferably, one of the following assembly methods of the ceiling lamp with the light guide plate is applicable.

An outer wall of the lamp cover, the annular groove and the round tray are made as die-cast one piece.

The outer wall of the lamp cover, the annular groove and the round tray are formed by bending aluminum profiles.

The ceiling lamp of the present invention reduces large-sized components in conventional lamps, which also reduces the cost. The ceiling lamp of the present invention is convenient to assemble.

Figure 1:
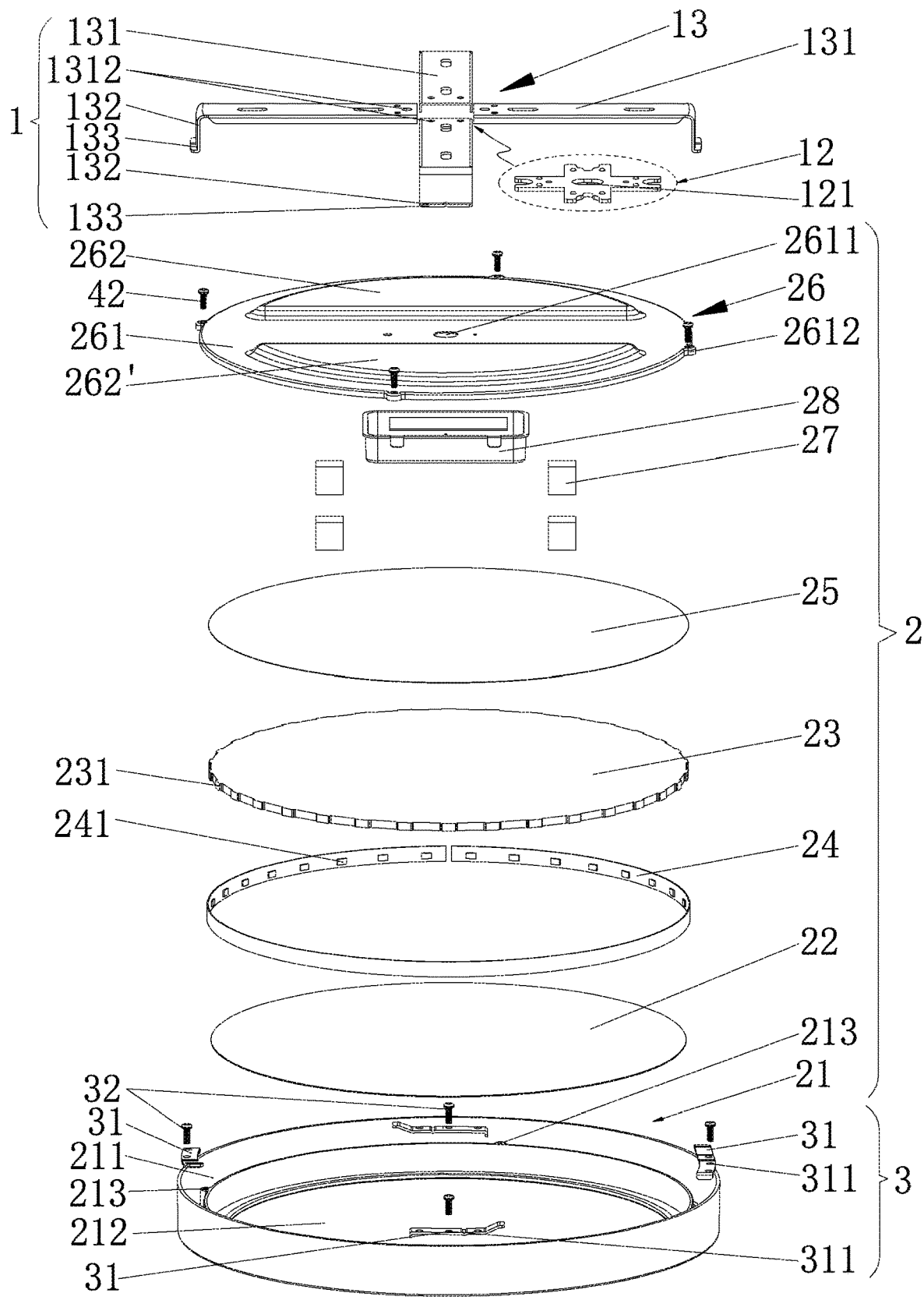
FIG. 1 is an exploded view of a ceiling lamp with a light guide plate of the present invention.

LIST OF REFERENCE NUMERALS 1. board assembly
12. cross-shaped connecting board
121. first center hole
13. bending sheet
131. slat
1311. second center hole
1312. positioning hole
132. bending portion
1321. second bump
133. brink
2. lamp body assembly
21. lamp cover
211. annular groove
212. round tray
213. lamp cover screw hole
22. optical diffuser
23. light guide plate
231. bulging block
24. aluminum board
241. LED light source
25. reflector board
26. backboard
261. board
2611. second center hole
2612. tapped hole
262. semi-circular-shaped convex
262. semi-circular-shaped concave cavity
27. sponge block
28. PCB
3. fixation assembly
31. buckle
311. screw hole
312. first bump
32. screw
42. screw

DETAILED DESCRIPTION OF ILLUSTRATED EMBODIMENTS

Embodiments of the present invention are further explained clearly as follows in conjunction with figures.

Figure 2:
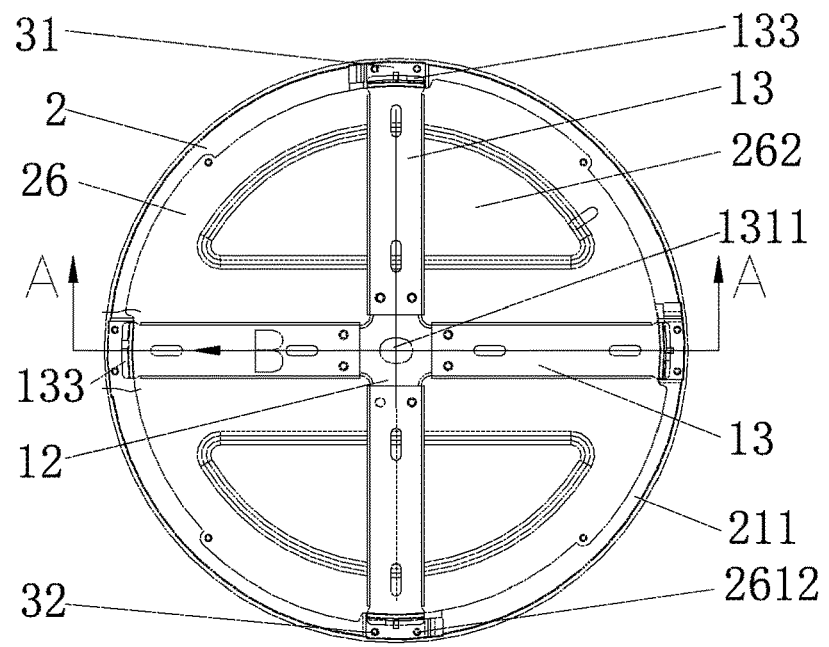
FIG. 2 is a top plan view showing a ceiling lamp with a light guide plate of the present invention after being assembled.
Figure 3:
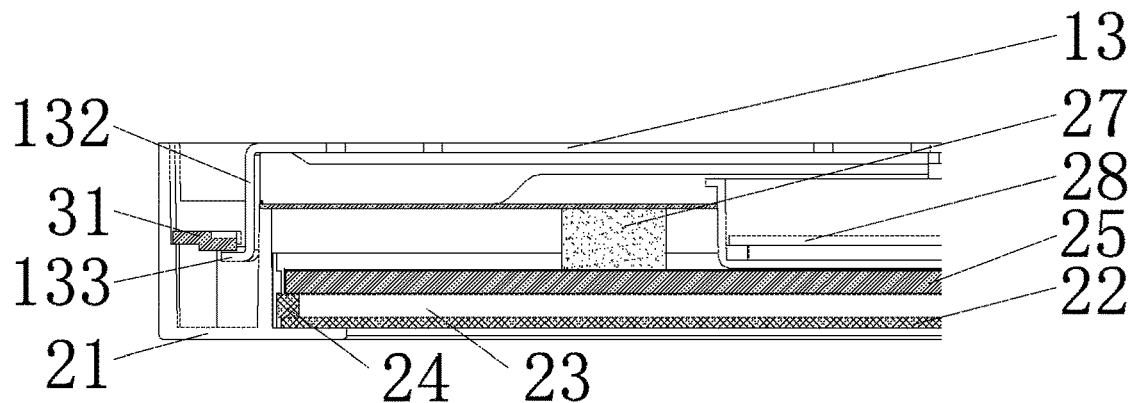
FIG. 3 is a cross-sectional view of the ceiling lamp taken along line A-A of FIG. 2.

Referring to FIGS. 1 to 3, a ceiling lamp with a light guide plate consists of a board assembly 1, and a lamp body assembly 2 attached to the board assembly 1 via a fixation assembly 3.

In the present embodiment, the board assembly 1 consists of a cross-shaped connecting board 12 pierced with a first center hole 121 and a bending sheet 13 attached to the cross-shaped connecting board 12, wherein the bending sheet 13 has a bending portion 132 that extends from an end of the bending sheet 13 and vertically stands against an edge of a backboard 26 and a brink 133 that projects from an end of the bending portion 132.

In the present embodiment, the bending sheet 13 consists of four slats 131 that form a cross, positioning holes 1312 located on the slats 131, four bending portions 132 each extending vertically from an end of the slat 131, and four brinks 133 each projecting from the bending portion 132.

In the present embodiment, the lamp body assembly 2 consists of a lamp cover 21 with a circumferential edge that has an annular groove 211, a plurality of lamp cover screw holes 213 that are vertically distributed on an internal surface of the annular groove 211, an optical diffuser 22, the light guide plate 23, an aluminum board 24 wrapping around a circumferential side wall of the light guide plate 23, a reflector board 25, and the backboard 26; wherein the optical diffuser 22, the light guide plate 23, the aluminum board 24 and the reflector board 25 are orderly arranged in a round tray 212 confined by the annular groove 211.

In the present embodiment, the backboard 26 consists of a board 261, a pair of semi-circular-shaped convexes 262 that are symmetrically protruding from two symmetrical semi-circle portions of one side of the board 261, a pair of semi-circular-shaped concave cavities 262 correspondingly formed on the other side of the board 261, a second center hole 2611 located on the board 261, and a plurality of tapped holes 2612 arranged on an edge of the backboard 26. Each of the semi-circular-shaped concave cavities 262 is provided with a PCB 28 and a plurality of sponge blocks 27 that are located around the PCB 28.

In the present embodiment, a plurality of bulging blocks 231 are radiated from the circumferential side wall of the light guide plate 23.

In the present embodiment, the aluminum board 24 is attached with an LED light source 241.

In the present embodiment, the fixation assembly 3 consists of a plurality of buckles 31, screw holes 311 arranged on the buckles 31, a plurality of first bumps 312 each arranged on the buckle 31, and screws 32 that screwed in the screw holes 311 to fix the buckles 31 to the annular groove 211.

In the present embodiment, the backboard 26, the optical diffuser 22, the light guide plate 23, the aluminum board 24, the LED light source 241 and the reflector board 25 are fixedly arranged in the light body assembly 2 through screws 42 screwing in the tapped holes 2612 on the backboard 26 and then in the lamp cover screw holes 213.

Figure 4:
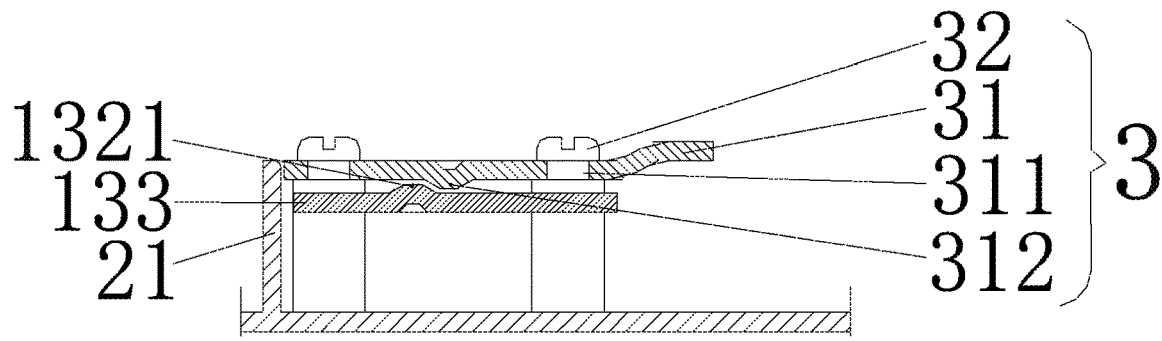
FIG. 4 is a cross-sectional view of the ceiling lamp taken in direction of line B of FIG. 2.

In the present embodiment, referring to FIGS. 3-4, the brinks 133 are placed in the annular groove 211, and pressed and stopped by the buckle 31 so as to immobilize the board assembly 1 and connect together the board assembly 1 and the lamp body assembly 2.

Referring to FIGS. 3-4, the buckle 31 located on an edge of an outer wall of the annular groove 211 of the lamp cover 21 is provided with the first bump 312. A second bump 1321 is provided on the brink 133 of the board assembly 1. When rotating the light body assembly 2, the first bump 312 on the buckle 31 thus clips to lock when hitting the second bump 1321 on the brink 133 of the board assembly 1, in this way, the assembly of the ceiling lamp is complete.

Referring to FIGS. 1 to 4, an assembly method of a ceiling lamp with a light guide plate comprises:

fixing a buckle 31 to an annular groove 211 of a lamp cover 21 through screwing screws 32;

welding a bending sheet 13 to a cross-shaped connecting board 12;

placing PCBs 28 and a plurality of sponge blocks 27 in two semi-circular-shaped convexes 262 of a backboard 26, connecting the PCB 28 to an LED light source 241 that is attached to an aluminum board 24;

placing an optical diffuser 22, the aluminum board 24 wrapping around a circumferential side wall of a light guide plate 23, a reflector board 25 and the backboard 26 successively in a round tray 212 of the lamp cover 21, fixing them to the lamp cover 21 through screwing screws 42 in tapped holes 2612 on the backboard 26;

rotating the light body assembly 2 to enable a first bump 312 on the buckle 31 to clip to lock when hitting a second bump 1321 on a brink 133 of the board assembly 1, so as to complete the assembly of the ceiling lamp.

In one embodiment of the present invention, an outer wall of the lamp cover 21, the annular groove 211 and the round tray 212 are made as die-cast one piece.

In another embodiment of the present invention, the outer wall of the lamp cover 211, the annular groove 211 and the round tray 212 are formed by bending aluminum profiles.

The above-mentioned embodiments are the preferred embodiments of the present invention and are considered in all respects as illustrative and not restrictive. Variations and modifications are allowed within the scope of the invention. Those skilled in the art will appreciate that the features described above can be combined in various ways to form multiple variations of the invention. As a result, such variations fall within the scope of the protection to the present invention.

What is claimed is that:

1. A ceiling lamp with a light guide plate, consisting of a board assembly, and
a light body assembly attached to the board assembly via a fixation assembly;
wherein the light body assembly consists of:
a lamp cover with a circumferential edge that has an annular groove,
a plurality of lamp cover screw holes that are vertically distributed on an internal surface of the annular groove,
an optical diffuser,
the light guide plate,
an aluminum board wrapping around a circumferential side wall of the light guide plate,
a reflector board, and
a backboard;
wherein the optical diffuser, the light guide plate, the aluminum board and the reflector board are orderly arranged in a round tray confined by the annular groove;
wherein the backboard consists of:
a board,
a pair of semi-circular-shaped convexes that are symmetrically protruding from two symmetrical semi-circle portions of one side of the board,
a pair of semi-circular-shaped concave cavities correspondingly formed on the other side of the board,
a second center hole located on the board, and
a plurality of tapped holes arranged on an edge of the backboard;
wherein each of the semi-circular-shaped concave cavities is provided with a PCB and a plurality of sponge blocks that are located around the PCB.

2. The ceiling lamp with the light guide plate according to claim 1, characterized in that a plurality of bulging blocks are radiated from the circumferential side wall of the light guide plate.

3. The ceiling lamp with the light guide plate according to claim 2, characterized in that the backboard, the optical diffuser, the light guide plate, the aluminum board, the LED light source and the reflector board are fixedly arranged in the light body assembly through screws screwing in the tapped holes on the backboard and then in the lamp cover screw holes; the bending portion is stopped from moving by a buckle located on an edge of an outer wall of the annular groove so that the board assembly is fixedly connected to the round tray confined by the annular groove and the light body assembly is therefore fixedly connected to the board assembly.

4. The ceiling lamp with the light guide plate according to claim 3, characterized in that the buckle located on the edge of the outer wall of the annular groove of the lamp cover is provided with a first bump; a second bump is provided on the brink of the board assembly; when rotating the light body assembly, the first bump on the buckle thus clips to lock when hitting the second bump on the brink of the board assembly.

5. The ceiling lamp with the light guide plate according to claim 1, characterized in that the board assembly consists of a cross-shaped connecting board pierced with a first center hole and a bending sheet attached to the cross-shaped connecting board, wherein the bending sheet has a bending portion that extends from an end of the bending sheet and vertically stands against an edge of the backboard of the light body assembly and a brink that projects from an end of the bending portion.

6. The ceiling lamp with the light guide plate according to claim 5, characterized in that the bending sheet consists of:
four slats that form a cross,
positioning holes that located on the slats,
four bending portions each extending vertically from an end of the slat, and
four brinks each projecting from the bending portion.

7. An assembly method of a ceiling lamp with a light guide plate, comprising:
fixing a buckle to an annular groove of a lamp cover through screwing screws;
welding a bending sheet to a cross-shaped connecting board, wherein the bending sheet has a bending portion that extends from an end of the bending sheet and vertically stands against an edge of a backboard and a brink that projects from an end of the bending portion;

placing PCBs and a plurality of sponge blocks in two semi-circular-shaped convexes of the backboard and connecting the PCBs to an LED light source that is attached to an aluminum board;

placing an optical diffuser, the aluminum board wrapping around a circumferential side wall of the light guide plate, a reflector board and the backboard successively into a round tray of the lamp cover, fixing the optical diffuser, the aluminum board, the light guide plate, the reflector board, and the backboard to the lamp cover through screwing screws into tapped holes on the backboard; and rotating a light body assembly consisting of the lamp cover, the optical diffuser, the light guide plate, the aluminum board, the reflector board, and the backboard to enable a first bump on the buckle to clip and to lock when hitting a second bump on the brink of the bending sheet so as to complete the assembly of the ceiling lamp.

8. The assembly method of the ceiling lamp with the light guide plate according to claim 7, characterized in that an outer wall of the lamp cover, the annular groove and the round tray are made as die-cast one piece; or the outer wall of the lamp cover, the annular groove and the round tray are formed by bending aluminum profiles.

* * * * *